US009368080B2

(12) United States Patent
Chun et al.

(10) Patent No.: US 9,368,080 B2
(45) Date of Patent: Jun. 14, 2016

(54) THREE-DIMENSIONAL DISPLAY AND DRIVING METHOD THEREOF

(75) Inventors: Byung-Ki Chun, Yongin (KR); Jong-Woong Park, Yongin (KR); Joo-Hyung Lee, Yongin (KR); Geun-Young Jeong, Yongin (KR); Yong-Seok Choi, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 1018 days.

(21) Appl. No.: 13/007,327

(22) Filed: Jan. 14, 2011

(65) Prior Publication Data

US 2012/0026204 A1 Feb. 2, 2012

(30) Foreign Application Priority Data

Jul. 30, 2010 (KR) ........................ 10-2010-0074211

(51) Int. Cl.

*G06T 15/00* (2011.01)
*G09G 3/36* (2006.01)
*G09G 3/00* (2006.01)
*G09G 3/34* (2006.01)

(52) U.S. Cl.

CPC .............. *G09G 3/3648* (2013.01); *G09G 3/003* (2013.01); *G09G 3/3406* (2013.01); *G09G 3/3607* (2013.01); *G09G 2320/0646* (2013.01); *G09G 2340/06* (2013.01)

(58) Field of Classification Search

CPC ........... G02B 27/2214; G02B 27/2207; G09G 3/003; H04N 13/0409
USPC ......... 345/87–90, 418–419, 690; 348/51, 602
See application file for complete search history.

(56) References Cited

U.S. PATENT DOCUMENTS

| | | | | |
|---|---|---|---|---|
| 7,268,747 | B2 * | 9/2007 | Taniguchi et al. | 345/6 |
| 7,986,375 | B2 * | 7/2011 | Krijn et al. | 349/15 |
| 8,373,684 | B2 * | 2/2013 | Kim et al. | 345/204 |
| 8,537,206 | B2 * | 9/2013 | Son et al. | 348/53 |
| 2004/0240777 | A1 * | 12/2004 | Woodgate et al. | 385/16 |
| 2005/0099689 | A1 * | 5/2005 | Fukushima et al. | 359/466 |
| 2009/0180180 | A1 * | 7/2009 | Shimshi et al. | 359/462 |

FOREIGN PATENT DOCUMENTS

| | | |
|---|---|---|
| KR | 10-2001-0103100 | 11/2001 |
| KR | 10-2006-0039057 | 5/2006 |
| KR | 10-2007-0120282 | 12/2007 |
| KR | 10-2008-0062922 (A) | 7/2008 |
| KR | 10-2009-0010826 | 1/2009 |
| KR | 10-2009-0040796 (A) | 4/2009 |

* cited by examiner

*Primary Examiner* — Calvin C Ma
(74) *Attorney, Agent, or Firm* — Knobbe Martens Olson & Bear LLP

(57) ABSTRACT

A three-dimensional (3D) display is disclosed. One aspect includes: a display unit including a plurality of pixels and a slit barrier selectively shielding light irradiated from the display unit. The display unit additionally includes a controller controlling the turn-on and turn-off of the slit barrier and generating a first back light compensation signal compensating the reduction of the luminance of the display unit when the slit barrier is turned off and a second back light compensation signal compensating the reduction of the luminance of the display when the slit barrier is turned on to compensate the luminance reduction by the slit barrier. According to at least one aspect of the 3D display using a slit barrier scheme, it is possible to minimize the deterioration of luminance by a slit barrier.

21 Claims, 7 Drawing Sheets

THREE-DIMENSIONAL DISPLAY AND DRIVING METHOD THEREOF

CROSS-REFERENCE TO RELATED APPLICATIONS

This application claims priority to and the benefit of Korean Patent Application No. 10-2010-0074211 filed in the Korean Intellectual Property Office on Jul. 30, 2010, the entire contents of which are incorporated herein by reference.

BACKGROUND

1. Field

The described technology relates to a three-dimensional display and a driving method thereof, and more particularly, to a three-dimensional display using a slit barrier and a driving method thereof.

2. Description of the Related Technology

A three-dimensional (3D) display implements a 3D stereoscopic effect in a two-dimensional (2D) image by using a binocular disparity principle in which when an object is close to a person, a disparity between both eyes increases and when the object is further from the person, the disparity between both eyes decreases. For example, when left and right images which match each other are displayed on a screen, a user feels as if an object is positioned on the screen. When the left image is disposed at the left side and the right image is disposed at the right side, the user feels as if the object is positioned in the rear of the screen and when the left image is disposed at the right side and the right image is disposed at the left side, the user feels as if the object is positioned in front of the screen. In this case, a depth effect of the object is determined by a gap between the left and right images which are disposed on the screen.

A method of displaying a 3D image, which is widely known, includes a scheme of separatively selecting a left image and a right image displayed in a reddish blue color with colored glasses using color filters having a color complementary relationship. In addition, the method also includes a scheme of displaying the left image and the right image with different polarizations and separatively selecting it by using polarizing glasses. The scheme using the colored glasses has a disadvantage in that the object is not displayed with natural colors and the scheme using the polarizing glasses has a disadvantage in that the left image is viewed to a right eye or the right image is viewed to a left eye depending on polarizance to deteriorate the 3D effect. It is a little inconvenient for the user to view the 3D image with wearing special glasses such as the colored glasses or the polarizing glasses.

In recent years, as a scheme to view the 3D image without wearing the special glasses, a lenticular sheet scheme, a back light distribution scheme, a slit barrier scheme, and the like have developed.

In the lenticular sheet scheme using a lenticular sheet in which cylindrical transparent plastic lenses are arranged in a line, two pixels corresponding to the left and right images are disposed in one lens. By a lens effect, a pixel disposed at the left side of the lens is viewed by only the right eye and a pixel disposed at the right side of the lens is viewed to only the left eye. The back light distribution scheme shines two back lights at a point corresponding to the position of a viewer. The back light distribution scheme requires a complicated information processing method in order to track the position of the viewer. The slit barrier scheme displays the stereoscopic image as the left image and the right image by selectively shielding light irradiated on an image display surface.

The slit barrier scheme serves to shield light in order to separate the left image and the right image from each other to cause the overall luminance of the display to be deteriorated. For example, when the slit barrier is designed such that its open region becomes 50% of the entire region, the overall brightness of the display decreases to 50% or less. As a result, the slit barrier scheme is difficult to implement a high-luminance 3D image.

Further, when the slit barrier is implemented as a liquid crystal display (LCD), it is possible to selectively display a 2D planar image and a 3D stereoscopic image by turning off the slit barrier at the time of displaying the 2D planar image and activating the slit barrier at the time of displaying the 3D stereoscopic image. The slit barrier LCD is additionally attached onto a general display panel. In this case, the overall luminance of the display decreases by approximately 20% or more even while the slit barrier is turned off The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One inventive aspect is a three-dimensional (3D) display including a display unit having a plurality of pixels, a slit barrier configured to selectively shielding light irradiated from the display unit, and a controller configured the turn-on and turn-off of the slit barrier. The controller is further configured to generate one of a first back light compensation signal compensating the reduction of the luminance of the display unit when the slit barrier is turned off, and a second back light compensation signal compensating the reduction of the luminance of the display when the slit barrier is turned on.

Another inventive aspect is a method of compensating luminance reduction by a slit barrier in a three-dimensional display. The method includes the steps of extracting a white image signal from three-color input image signals to generate four-color compensation image signals, determining a back light level in accordance with the luminance of the four-color compensation image signals, generating a back light compensation signal compensating the luminance reduction by the slit barrier to compensate the back light level, and outputting a back light pulse in accordance with the compensated back light level.

Another inventive aspect is a method of driving a three-dimensional display. The method includes the steps of extracting a white image signal from three-color input image signals to generate four-color compensation image signals, determining whether or not the 3D three-dimensional display operates in a 3D mode to map the four-color compensation image signals in accordance with any one of a first logical arrangement structure of a T type and a second logical arrangement structure of a 2×2 matrix type, and deciding the sequence of the four-color compensation image signals mapped to any one of the first logical arrangement structure and the second logical arrangement structure in accordance with a physical arrangement structure of pixels to configure an image data signal.

DETAILED DESCRIPTION OF CERTAIN INVENTIVE EMBODIMENTS

Figure 1:
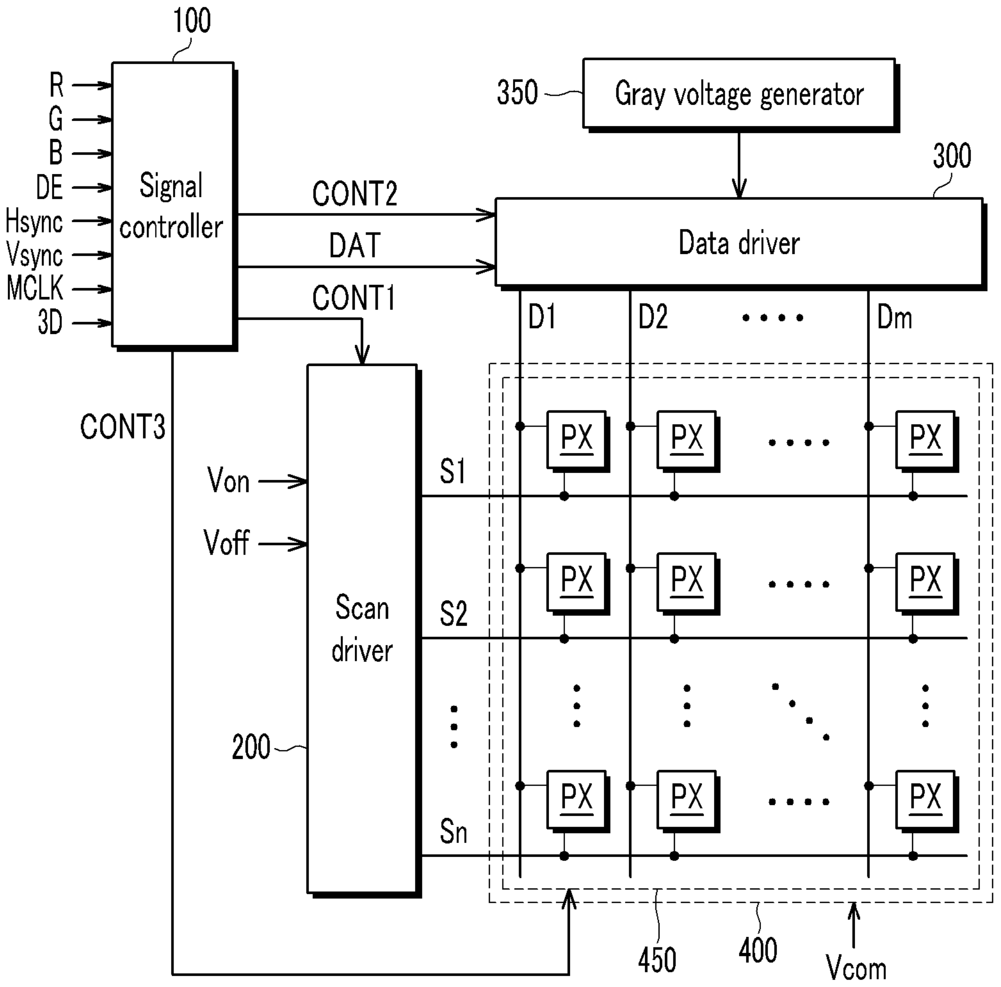
FIG. 1 is a block diagram illustrating a three-dimensional (3D) display according to an exemplary embodiment of the present invention.

Various aspects and features are described more fully hereinafter with reference to the accompanying drawings, in which exemplary embodiments are shown. As those skilled in the art would realize, the described embodiments may be modified in various different ways, all without departing from the spirit or scope of the present invention.

Further, in the exemplary embodiments, like reference numerals designate like elements throughout the specification representatively in a first exemplary embodiment and only elements other than those of the first exemplary embodiment will be described.

The drawings and description are to be regarded as illustrative in nature and not restrictive. Like reference numerals designate like elements throughout the specification.

In the specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram illustrating a three-dimensional (3D) display according to an exemplary embodiment of the present invention.

Referring to FIG. 1, the 3D display includes a display unit 400 and a scan driver 200 connected thereto, a data driver 300, a gray voltage generator 350 connected to the data driver 300, a signal controller 100 controlling each of the drivers 200 and 300, and a slit barrier 450 selectively shielding light irradiated from the display unit 400.

The display unit 400 includes a plurality of scan lines S1 to Sn, a plurality of data lines D1 to Dm, and a plurality of pixels PX which are connected to the plurality of signal lines S1 to Sn and D1 to Dm and are arranged substantially in a matrix. The plurality of scan lines S1 to Sn extend substantially in a row direction and are substantially in parallel to each other, and the plurality of data lines D1 to Dm are substantially in a column direction and are substantially in parallel to each other. The plurality of scan lines S1 to Sn are connected to the scan driver 200 and the plurality of data lines D1 to Dm are connected to the data driver 300.

The scan driver 200 is connected to the plurality of scan lines S1 to Sn of the display unit 400 and applies a scan signal formed by combining gate on voltage Von and gate off voltage Voff to the plurality of scan lines S1 to Sn.

The data driver 300 is connected to the plurality of data lines D1 to Dm of the display unit 400 and selects gray voltage in the gray voltage generator 350 to apply the selected gray voltage to the plurality of data lines D1 to Dm as data voltage. The gray voltage generator 350 may provide only reference gray voltage of a predetermined number without providing voltages for all grays. In this case, the data driver 300 divides the reference gray voltage to generate gray voltages for all grays and may select data voltage Vdat corresponding to a data signal among them.

A slit-shaped barrier is generated outside of the display unit 400. The slit barrier 450 which selectively shields light irradiated from the display unit 400 covers the entirety of a display area of the display unit 400. The slit barrier 450 is turned off at the time of displaying a 2D planar image and turned on at the time of displaying a 3D stereoscopic image.

Meanwhile, a back light (not shown) controlling the luminance of an image displayed in the display unit 400 is provided inside of the display unit 400.

The signal controller 100 controls the driving of the scan driver 200, the data driver 300, the slit barrier 450, and the back light. The signal controller 100 generates four-color output image signals R', G', B' and W' from three-color input image signals R, G, and B inputted from the outside and transfers them to the data driver 300 as an image data signal DAT. In this case, the signal controller 100 controls turn-on/turn-off of the slit barrier 450 in accordance with a 3D determination signal 3D and adjusts the logical arrangement of the pixels. The signal controller 100 compensates the reduction of the luminance by generating a back light compensation signal for compensating the reduction of the luminance of the image displayed in the display unit 400 depending on the turn-on/turn-off of the slit barrier 450.

Each of the drivers 100, 200, 300, and 350 may be directly mounted on the display unit 400 in the form of at least one integrated circuit chip, mounted on a flexible printed circuit film, attached to the display unit 400 in the form of a tape carrier package (TCP), or mounted on an additional printed circuit board. Alternately, the drivers 100, 200, 300, and 350 may be integrated on the display unit 400 together with the signal lines S1 to Sn and D1 to Dm.

The 3D display according to the exemplary embodiment may be implemented as various flat panel display devices such as a liquid crystal display (LCD), a field emission display (FED), a plasma display panel (PDP), an organic light emitting diode (OLED) display, and the like. Hereinafter, for better comprehension and ease of description, the LCD is described as an example, but the 3D display according to an exemplary embodiment of the present invention is not limited thereto.

Figure 2:
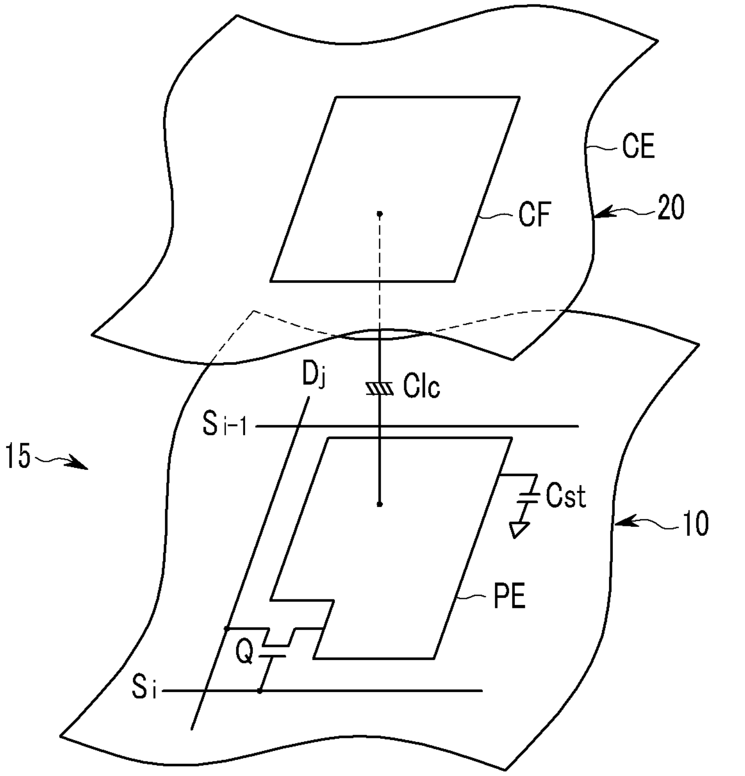
FIG. 2 illustrates an equivalent circuit of a pixel of the 3D display according to an exemplary embodiment of the present invention.

FIG. 2 illustrates an equivalent circuit of a pixel of the 3D display according to an exemplary embodiment.

Referring to FIG. 2, the display unit 400 includes a thin film transistor display panel 10 and a common electrode display panel 20 which face each other, a liquid crystal layer 15 interposed therebetween, and a spacer (not shown) which makes a space between two display panels 10 and 20 and is compression-transformed to some extent.

When one pixel PX of the display unit 400 is described, pixels PX connected to i-th (i=1 to n) scan lines Si and j-th (j=1 to m) data lines Dj include a switching element Q, and a liquid crystal capacitor Clc and a sustain capacitor Cst which are connected thereto.

The switching element Q as a three-terminal element such as a thin film transistor, or the like which is provided on the thin film transistor display panel 10 includes a gate electrode connected to the scan lines Si, an input terminal connected to data lines Di, and an output terminal connected to a pixel electrode PE of the liquid crystal capacitor Clc. The thin film transistor includes amorphous silicon or poly crystalline silicon.

The liquid crystal capacitor Clc includes the pixel electrode PE of the thin film transistor display panel 10 and a common electrode CE of the common electrode display panel 20 which is opposed thereto. That is, the liquid crystal capacitor Clc has the pixel electrode PE of the thin film transistor display panel 10 and the common electrode CE of the common electrode display panel 20 as both terminals thereof and the liquid crystal layer 15 interposed between the pixel electrode PE and the common electrode CE serves as a dielectric of the liquid crystal layer 15.

The pixel electrode PE is connected to the switching element Q, and the common electrode CE is formed on the overall surface of the common electrode display panel 20 and is applied with common voltage Vcom. Meanwhile, the common electrode CE may be provided on the thin film transistor display panel 10. In this case, at least one of the pixel electrode PE and the common electrode CE may have a linear shape or a stick shape. The common voltage Vcom is constant voltage having a predetermined level and may have voltage of approximately OV.

The sustain capacitor Cst which plays an auxiliary role of the liquid crystal capacitor Clc is formed by overlapping an additional signal line (not shown) and the pixel electrode PE that are provided on the thin film transistor display panel 10 with an insulator interposed therebetween. Predetermined voltage such as the common voltage Vcom is applied to the additional signal line.

A color filter CF may be formed in a partial area of the common electrode CE of the common electrode display panel 20. Each pixel PX uniquely displays one of primary colors (spatial division) or each pixel PX alternately displays the primary colors depending on the time (temporal division) to allow a desired color to be recognized through spatial and temporal sums of the primary colors. Examples of the primary colors may include three primary colors of a red color, a green color, and a blue color.

Herein, as one example of the spatial division, each pixel PX includes the color filter CF representing one of the primary colors, which is provided on the common electrode display panel 20 corresponding to the pixel electrode PE. Contrary to this, the color filter CF may be formed above or below of the pixel electrode PE of the thin film transistor display panel 10.

Figure 3:
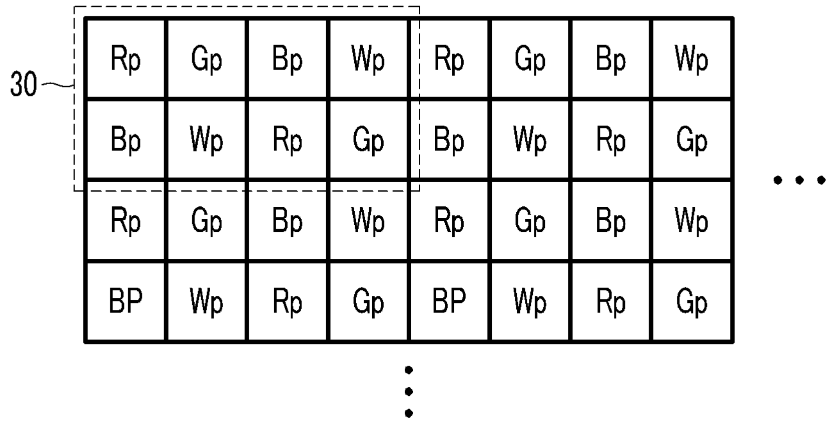
FIG. 3 is a block diagram illustrating a physical arrangement of a pixel of the 3D display according to an exemplary embodiment of the present invention.

FIG. 3 is a block diagram illustrating a physical arrangement of a pixel of the 3D display according to an exemplary embodiment.

Referring to FIG. 3, a red pixel Rp emitting red light, a green pixel Gp emitting green light, a blue pixel Bp emitting blue light, and a white pixel Wp emitting white light are arranged in a matrix in the display unit 400 of the 3D display. The red pixel Rp, the green pixel Gp, the blue pixel Bp, and the white pixel Wp which are adjacent to each other in sequence are included in an odd-numbered pixel row (hereinafter, referred to as 'a first pixel row'). The blue pixel Bp, the white pixel Wp, the red pixel Rp, and the green pixel Gp which are adjacent to each other in sequence are included in an even-numbered pixel row (hereinafter, referred to as 'a second pixel row'). A basic unit 30 which is constituted by the first pixel row and the second pixel row adjacent to each other is repetitively disposed in a row direction and a column direction in the display unit 400.

Hereinafter, referring to FIGS. 1 to 3, an operation of the 3D display according to an exemplary embodiment will be described in detail.

The signal controller 100 receives input image signals R, G, and B inputted from an external device and input control signals controlling the display thereof. The input image signals R, G, and B contain luminance information of each pixel PX and the luminance has grays of a predetermined number, i.e., 1024 ($=2^{10}$), 256 ($=2^{8}$), or 64 ($=2^{6}$). Examples of the input control signals include a vertical synchronization signal Vsync and a horizontal synchronization signal Hsync, a main clock MCLK, a data enable signal DE, a 3D determination signal, and the like.

The signal controller 100 extracts white image signals from three-color input image signals R, G, and B and appropriately processes the extracted signals in accordance with an operation condition of the display unit 400 to generate four-color compensation image signals R', G' B', and W'. The signal controller 100 transfers the compensation image signals R', G' B', and W' to the data driver 300 as the image data signal DAT.

The 3D display according to an exemplary embodiment operates in a 2D mode displaying the 2D planar image and in a 3D mode displaying the 3D stereoscopic image. A signal controlling the operation is the 3D determination signal 3D inputted from the outside. The controller 100 determination the 2D-mode or 3D-mode operation depending on the input of the 3D determination signal 3D or not signal characteristics of the 3D determination signal 3D.

When the 3D determination signal 3D indicates the 2D-mode operation, the signal controller 100 turns off the slit barrier 450 and generates a first back light compensation signal for compensating the reduction of basic luminance by the slit barrier 450. In this case, the signal controller 100 processes the compensation image signals R', G', B', and W' to be mapped in accordance with a first logical arrangement structure of a T-pixel.

When the 3D determination signal 3D indicates the 3D-mode operation, the signal controller 100 activates the slit barrier 450 and generates a second back light compensation signal for compensating the reduction of basic luminance by the slit barrier 450 and the reduction of the luminance by an aperture ratio of the slit barrier 450. In addition, the signal controller 100 processes the compensation image signals R', G', B', and W' to be mapped in accordance with a second logical arrangement structure of a 2×2 matrix pixel.

The signal controller 100 generates a scan control signal CONT1, a data control signal CONT2, and a slit barrier control signal CONT3. The signal controller 100 transfers the scan control signal CONT1 to the scan driver 200 and transfers the data control signal CONT2 to the data driver 300 together with the processed image data signal DAT. The signal controller 100 transfers the slit barrier control signal CONT3 for turning on/turning off the slit barrier 450 depending on the 3D-mode operation or not to the slit barrier 450.

The scan control signal CONT1 includes a scanning start signal STV in the scan driver 200 and at least one clock signal controlling the outputting of the gate on voltage Von. The scan control signal CONT1 may also further include an output enable signal OE for limiting a duration time of the gate on voltage Von.

The data control signal CONT2 includes a horizontal synchronization start signal STH indicating the transmission start of the data signal of one pixel row, a load signal LOAD directing the application of the data signal to the plurality of data lines D1 to Dm, and a data clock signal HCLK. The data control signal CONT2 may further include a reversion signal RVS for reversing a voltage polarity of the data signal for the common voltage Vcom.

The slit barrier control signal CONT3 includes a slit barrier turn-on signal for turning on the slit barrier 450 and a slit barrier turn-off signal for turning off the slit barrier 450.

When the scan driver 200 applies the gate on voltage Von to scan lines Si of one pixel row in accordance with the scan control signal CONT1, the switching element Q connected to the scan lines Si is turned on and the data signal applied to the plurality of data lines D1 to Dm is applied to the corresponding pixel PX through the switching element Q which is turned on.

A difference between the data voltage Vdat applied to the pixel PX and the common voltage Vcom is represented as charging voltage of the liquid crystal capacitor Clc, that is, pixel voltage. In accordance with the pixel voltage, an electric field is generated in the liquid crystal layer and the transmittance of light passing through the liquid crystal layer 15 is adjusted to thereby display an image. As such, the data signal is inputted into each pixel PX.

By repetitively performing the above process by the unit of a 1 horizontal period (also written as "1H", equivalent to one period of the horizontal synchronization signal Hsync and the data enable signal DE), the gate on voltage Von is sequentially applied to all the scan lines S1 to Sn and the data signal is applied to all the pixels PX to display an image of one frame.

When one frame ends and the subsequent frame starts, the data driver 300 generates the data voltage so that the polarity of the data signal applied to each pixel PX is opposite to the polarity of the previous frame in accordance with the reversal signal RVS. This is referred to as frame reversion. Even in one frame, the polarity of the data signal transferred through one data line may be changed in accordance with a characteristic of the reversal signal RVS (row reversion, point reversion) or the polarities of the image data signals applied to one pixel row may also be different from each other (column reversion, point reversion).

Hereinafter, referring to FIGS. 4 to 6, when the 3D display according to an exemplary embodiment operates in the 2D mode and in the 3D mode, the signal controller 100 which generates the back light compensation signal and adjusts the logical arrangement structure of the pixel will be described in detail.

Figure 4:
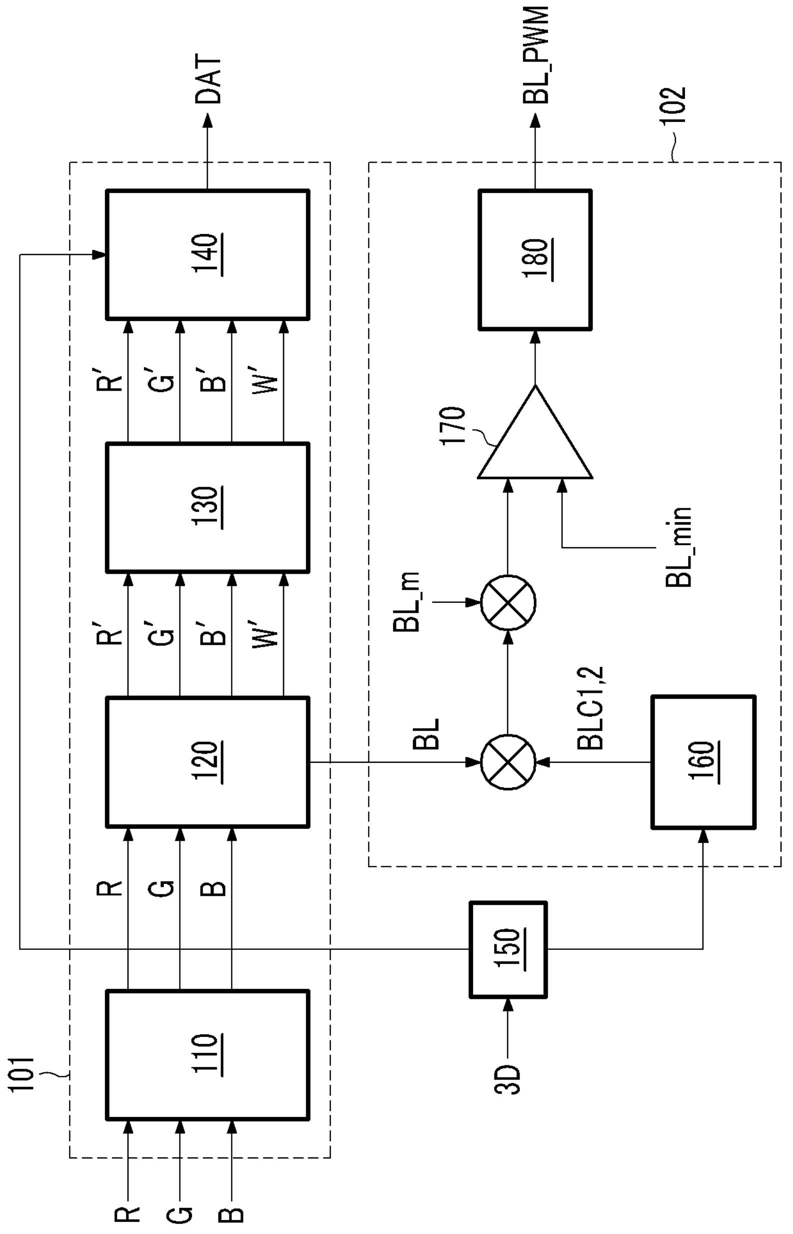
FIG. 4 is a block diagram illustrating a signal controller of the 3D display according to an exemplary embodiment of the present invention.

FIG. 4 is a block diagram illustrating a signal controller of the 3D display according to an exemplary embodiment.

Referring to FIG. 4, the signal controller 100 includes an image data generation unit 101 which receives three-color input image signals R, G, and B to generate four-color compensation image signals R', G', B', and W' and adjusts the logical arrangement structure of the pixel to output the image data signal DAT, a back light adjustment unit 102 which generates a back light compensation signal to adjust a back light pulse, and a 3D determination unit 150 which receives the 3D determination signal 3D to determine the 3D-mode operation or not.

The image data generation unit 101 includes a buffer 110 receiving and storing three-color input image signals R, G, and B, a first processing unit 120 which extracts a white image signal W from three-color input image signals R, G, and B to generate four-color compensation image signals R', G', B', and W', a second processing unit 130 which minutely adjusts the four-color compensation image signals R', G', B', and W', and a mapper 140 which adjusts the logical arrangement structure of the pixel and maps the minutely adjusted compensation image signals R', G', B', and W' in accordance with the logical arrangement structure of the pixel to output the image data signal DAT.

The back light adjustment unit 102 includes a back light compensation unit 160 which generates a first back light compensation signal BLC1 and a second back light compensation signal BLC2, a comparison unit 170 which calculates a difference between a lowest back light level and a compensated back light level, and a back light output unit 180 which generates and outputs the back light pulse depending on the compensated back light level.

The 3D determination unit 150 determines the 3D-mode operation or not in accordance with the received 3D determination signal 3D and transfers the 2D-mode signal or the 3D-mode signal for directing the determined 3D-mode operation or not to the mapper 140 and the back light compensation unit 160. The 2D-mode signal directs that the 3D display operates in the 2D mode and the 3D-mode signal directs that the 3D display operates in the 3D mode.

The buffer 110 receives three-color input image signals R, G, and B and transfers the input image signals R, G, and B to the first processing unit 120 by the unit of a frame.

The first processing unit 120 extracts the white image signal from the input image signals R, G, and B and adjusts the luminances of the input image signals R, G, and B on the extracted white image signal to generate four-color compensation image signals R', G', B', and W'. In this case, the first processing unit 120 determines the back light level in accordance with the luminances of the compensation image signals R', G', B', and W' and generates the back light signal BL for directing the determined back light level.

The second processing unit 130 receives the compensation image signals R', G', B', and W' from the first processing unit 120 and compares the compensation image signals R', G', B', and W' with an image signal of the previous frame or an adjacent frame to generate the minutely adjusted compensation image signals R', G', B', and W'. The second processing unit 130 transfers the minutely adjusted compensation image signals R', G', B', and W' to the mapper 140.

The mapper 140 modifies the logical arrangement structure of the pixel in accordance with the 2D-mode signal or the 3D-mode signal which is received from the 3D determination unit 150. The mapper 140 maps the minutely adjusted compensation image signals R', G', B', and W' in accordance with the logical arrangement structure of the pixel to output the image data signal DAT. The logical arrangement structure of the pixel means arrangement structures of the red pixel Rp, the green pixel Gp, the blue pixel Bp, and the white pixel Wp into which the compensation image signals R', G', B', and W' forming one dot are inputted.

When the mapper 140 receives the 2D-mode signal, the mapper 140 switches the logical arrangement structure of the pixel into a first logical arrangement structure of a T type to map the compensation image signals R', G', B', and W' by the unit of the first logical arrangement structure. When the mapper 140 receives the 3D-mode signal, the mapper 140 switches the logical arrangement structure of the pixel into a second logical arrangement structure of a 2×2 matrix type to map the compensation image signals R', G', B', and W' by the unit of the second logical arrangement structure. The second logical arrangement structure is an arrangement structure for compensating the blue pixel Bp interrupted by the slit barrier which is turned on in the 3D mode.

The mapper 140 configures the image data signal DAT by deciding the sequence of the compensation image signals R', G', B', and W' so that the compensation image signals R', G', B', and W' mapped in accordance with the first logical arrangement structure or the second logical arrangement structure are inputted to be suitable for the physical arrangement structure of the pixel.

When the back light compensation unit 160 receives the 2D-mode signal, the back light compensation unit 160 generates the first back light compensation signal BLC1 for compensating the reduction of basic luminance by the slit barrier. The first back light compensation signal is added to the back light signal BL outputted from the first processing unit 120 to compensate the back light level. For example, when the luminance displayed in the display unit 400 is A (the luminance indicated by the back light signal BL outputted from the first processing unit 120 may be referred to as A) and luminance is basically reduced by 20% by the slit barrier which is turned off, luminance of 0.8×A is displayed before luminance compensation. In this case, when the first back light compensation signal BLC1 is generated as 1.25, which is multiplied by the back light signal BL, 0.8×A×1.25=1A to compensate the luminance which is basically reduced by the slit barrier.

When the back light compensation unit 160 receives the 3D-mode signal, the back light compensation unit 160 generates a second back light compensation signal BLC2 for compensating the basic luminance reduction by the slit barrier and luminance reduction by the aperture ratio of the slit barrier. The second back light compensation signal is added to the back light signal BL outputted from the first processing unit 120 to compensate the back light level. For example, when the luminance displayed in the display unit 400 is A (the luminance indicated by the back light signal BL outputted from the first processing unit 120 may be referred to as A), and luminance is basically reduced by 20% by the slit barrier and luminance is reduced by 50% by the aperture ratio of the slit barrier which is turned on, luminance of 0.8×0.5×A is displayed before luminance compensation. In this case, when the second back light compensation signal BLC2 is generated as 2.3, which is multiplied by the back light signal BL, 0.8×0.5×A×2.3=0.92A to compensate the luminance which is basically reduced by the slit barrier and the luminance which is reduced by the aperture ratio.

A manual back light signal BL_m which is adjusted by a user may be added to the back light signal to which the first back light compensation signal BLC1 or the second back light compensation signal BLC2 is applied.

The comparison unit 170 calculates a difference between a back light level in which the first back light compensation signal BLC1 or the second back light compensation signal BLC2 is applied to compensate the luminance and the lowest back light level and transfers the difference to the back light output unit 180.

The back light output unit 180 determines a pulse width of the back light pulse BL_PWM in accordance with the difference between the compensated back light level and the lowest back light level, and generates and outputs the back light pulse BL_PWM. The first back light compensation signal BLC1 or the second back light compensation signal BLC2 is applied to the outputted back light pulse BL_PWM to compensate the reduction of the luminance by the slit barrier. As a result the 3D display may minimize the reduction of the luminance by the slit barrier in the 2D mode or the 3D mode.

Figure 5:
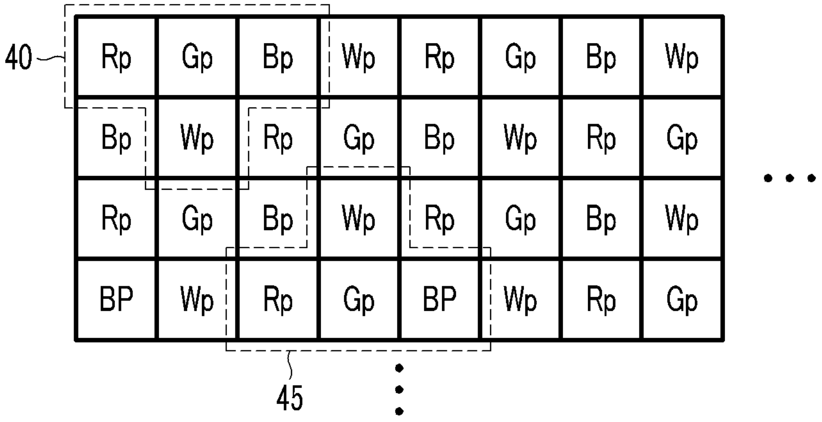
FIG. 5 is a block diagram illustrating a logical arrangement structure of a pixel when a 3D display is driven in a 2D mode according to an exemplary embodiment of the present invention.

FIG. 5 is a block diagram illustrating a logical arrangement structure of a pixel when a 3D display is driven in a 2D mode according to an exemplary embodiment.

Referring to FIG. 5, when the 3D display is driven in the 2D mode, the mapper 140 maps the compensation image signals R', G', B', and W' by the unit of the first logical arrangement structure of the pixel.

The first logical arrangement structure of the pixel includes a T-type arrangement structure 40 that includes the red pixel Rp, the green pixel Gp, and the blue pixel Bp of the first pixel row which are sequentially adjacent to each other and the white pixel Wp of the second pixel row adjacent to the first pixel row. In addition, the first logical arrangement structure of the pixel includes an inverted T-type arrangement structure 45 that includes the red pixel Rp, the green pixel Gp, and the blue pixel Bp of the second pixel row which are sequentially adjacent to each other and the white pixel Wp of the first pixel row adjacent to the second pixel row. That is, the first logical arrangement structure of the pixel is formed by combining the T-type arrangement structure 40 and the inverted T-type arrangement structure 45 with each other.

The mapper 140 maps the compensation image signals R', G', B', and W' corresponding to one dot to the T-type arrangement structure 40 or the inverted T-type arrangement structure 45. The mapper 140 maps all the compensation image signals R', G', B', and W' included in one frame in accordance with the first logical arrangement structure and thereafter, decides the sequence of the compensation image signals in accordance with the physical arrangement structure of the pixel to configure the image data signal DAT. That is, the mapper 140 configures the image data signal DAT from the first pixel row in the physical arrangement structure of the pixel.

Figure 6:
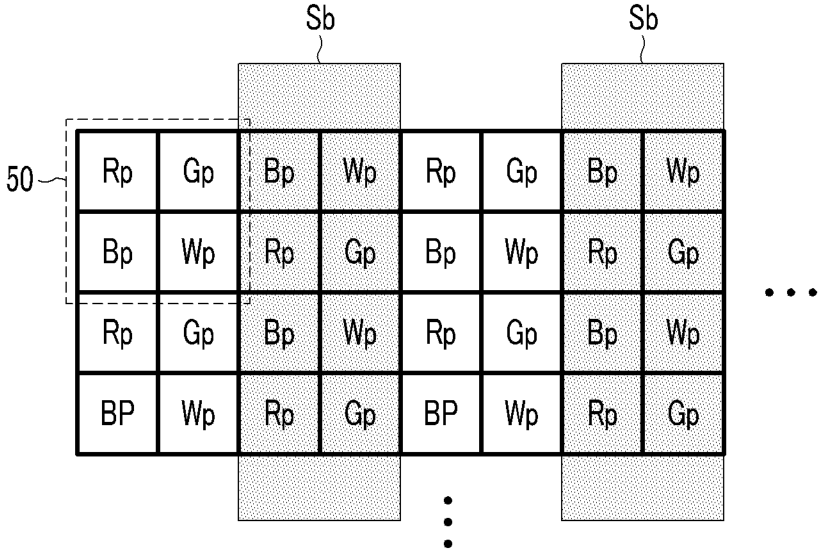
FIG. 6 is a block diagram illustrating a logical arrangement structure of a pixel when a 3D display is driven in a 3D mode according to an exemplary embodiment of the present invention.

FIG. 6 is a block diagram illustrating a logical arrangement structure of a pixel when a 3D display is driven in a 3D mode according to an exemplary embodiment.

Referring to FIG. 6, when the 3D display is driven in the 3D mode, the slit barrier is turned on to selectively interrupt an image viewed to a left eye and an image viewed to a right eye. FIG. 6 assumes a case in which the right image is interrupted by the slit barrier Sb and the left image is viewed to the left eye or a case in which the left image is interrupted by the slit barrier Sb and the right image is viewed to the right eye.

Two pixel columns are viewed to the left eye or the right eye through one opening of the slit barrier Sb. In the display unit 400, a set of two pixel columns which are viewed to the left eye through the opening the slit barrier Sb displays the left image. In the display unit 400, a set of two pixel columns which are viewed to the right eye through the opening the slit barrier Sb displays the right image.

If the compensation image signals R', G', B', and W' are mapped in accordance with the first logical arrangement structure of the T type or inverted T type while the slit barrier is turned on, the blue pixel Bp configuring the dot is covered with the slit barrier Sb to be not viewed. In order to solve the problem, when the 3D display is driven in the 3D mode, the mapper 140 maps the compensation image signals R', G', B', and W' by the unit of the second logical arrangement structure of the pixel.

The second logical arrangement structure of the pixel includes a 2×2 matrix type arrangement structure 50 including the red pixel Rp and the green pixel Gp adjacent to each other in the first pixel row and the blue pixel Bp and the white pixel Wp in the second pixel row adjacent to the first pixel row. When the arrangement structure 50 displays the left image, the second logical arrangement structure of the pixel which displays the right image (a part which is not viewed by being covered with the slit barrier Sb in the left eye) includes a 2×2 matrix type arrangement structure that includes the blue pixel Bp and the white pixel Wp adjacent to each other in the first pixel row and the red pixel Rp and the green pixel Gp in the second pixel row adjacent to the first pixel row.

That is, the mapper 140 shifts and maps the compensation image signal B' mapped to the blue pixel Bp of the first pixel row in the 2D mode to the blue pixel Bp of the second pixel row in the 3D mode. In addition, the mapper 140 shifts and maps the compensation image signal B' mapped to the blue pixel Bp of the second pixel row in the 2D mode to the blue pixel Bp of the first pixel row in the 3D mode.

The mapper 140 maps the compensation image signals R', G', B', and W' corresponding to one dot to the 2×2 matrix type arrangement structure and all the compensation image signals R', G', B', and W' included in one frame and thereafter, decides the sequence of the compensation image signals in accordance with the physical arrangement structure of the pixel to configure the image data signal DAT. That is, the mapper 140 configures the image data signal DAT from the first pixel row in the physical arrangement structure of the pixel.

Figure 7:
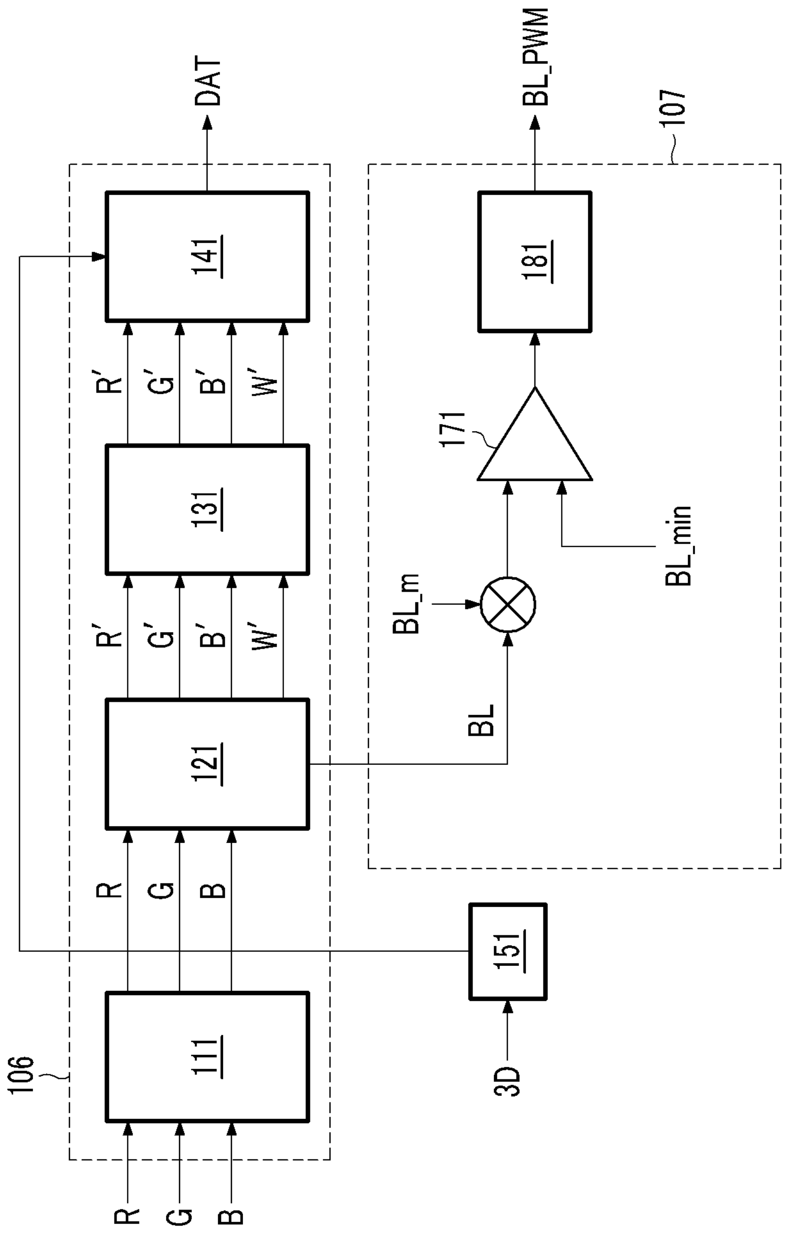
FIG. 7 is a block diagram illustrating a signal controller of a 3D display according to another exemplary embodiment of the present invention.

FIG. 7 is a block diagram illustrating a signal controller of a 3D display according to another exemplary embodiment.

Referring to FIG. 7, the 3D display may be configured by attaching the slit barrier to the existing display device and the back light compensation unit 160 may be removed from the 3D display.

The signal controller of the 3D display which is removed with the back light compensation unit 160 includes an image data generation unit 106, a back light adjustment unit 107, and a 3D determination unit 151.

The image data generation unit 106 includes a buffer 111, a first processing unit 121, a second processing unit 131, and a mapper 141. The image data generation unit 106 operates as described in FIG. 4.

The 3D determination unit 151 determines a 3D -mode operation or not depending on a received 3D determination signal 3D and transfers a 2D -mode signal or a 3D -mode signal for directing the determination of the 3D -mode operation or not to the mapper 141.

The back light adjustment unit 102 includes a comparison unit 171 which calculates a difference between a lowest back light level and a back light level of a back light signal BL outputted from the first processing unit 121 and a back light output unit 180 which generates and outputs a back light pulse in accordance with the back light level. A manual back light signal BL_m is added to the back light signal BL outputted from the first processing unit 121. In this case, it is possible to compensate basic luminance reduction by a slit barrier and/or the reduction of luminance by an aperture ratio of the slit barrier by setting the manual back light signal BL_m to direct a high back light level.

The referenced drawings and described detailed description of the present invention are the exemplary of the present invention and are used for the purpose of merely describing the present invention, not limiting the scope of the present invention which is included in the appended claims. Therefore, it will be appreciated to those skilled in the art that various modifications are made and other equivalent embodiments are available. Accordingly, the actual scope of the present invention must be determined by the spirit of the appended claims.

What is claimed is:

1. A three-dimensional (3D) display, comprising:

a display unit comprising a plurality of pixels;

a slit barrier configured to selectively shield light irradiated from the display unit; and a controller configured to turn-on and turn-off the slit barrier;

a back light adjustment unit configured to generate one of a first back light compensation signal compensating the reduction of the luminance of the display unit when the slit barrier is turned off, and a second back light compensation signal compensating the reduction of the luminance of the display when the slit barrier is turned on; and a back light output unit configured to generate a back light pulse having a pulse width, wherein the pulse width is configured to vary based on:

(i) a lowest back light level, and (ii) the first back light compensation signal when the slit barrier is turned off and the second back light compensation signal when the slit barrier is turned on.

2. The display of claim 1, wherein the controller comprises:

an image data generation unit configured to:

extract a white image signal from three-color input image signals;

generate four-color compensation image signals;

adjust a logical arrangement structure of the plurality of pixels to output an image data signal; and a 3D determination unit configured to generate one of i) a two-dimensional (2D)-mode signal for directing a 2D-mode operation, and ii) a 3D-mode signal for directing a 3D-mode operation, and transfer a corresponding signal to the image data generation unit and the back light adjustment unit.

3. The display of claim 2, wherein the image data generation unit comprises:

a processing unit configured to extract the white image signal from the three-color input image signals, and generate the four-color compensation image signals; and a mapper configured to adjust the logical arrangement structure of the plurality of pixels and map the compensation image signal in accordance with the logical arrangement structure.

4. The display of claim 3, wherein:

the processing unit is configured to adjust the luminance of the three-color input image signals on the basis of the white image signal and generate a back light signal indicating a back light level determined depending on the luminance of the four-color compensation image signals.

5. The display of claim 3, wherein:

if the mapper receives the 2D-mode signal, the mapper is configured to map the four-color compensation image signals in accordance with a first logical arrangement structure comprising a red pixel, a green pixel, a blue pixel and a white pixel, wherein the red pixel, the green pixel, and the blue pixel are sequentially adjacent to each other in a first pixel row, and the white pixel is in a second pixel row which is adjacent to the first pixel row.

6. The display of claim 3, wherein:

if the mapper receives the 3D-mode signal, the mapper is configured to map the four-color compensation image signals in accordance with a second logical arrangement structure including a red pixel, a green pixel, a blue pixel and a white pixel, wherein the red pixel and the green pixel are adjacent to each other in a first pixel row, and the blue pixel and the white pixel are adjacent to each other in a second pixel row which is adjacent to the first pixel row.

7. The display of claim 3, wherein:

the image data generation unit further comprises a buffer configured to receive the three-color input image signals and transfer the three-color input image signals to the processing unit by a unit of a frame.

8. The display of claim 2, wherein:

if the back light adjustment unit receives the 2D-mode signal, the back light adjustment unit is configured to generate the first back light compensation signal, and if the back light adjustment unit receives the 3D-mode signal, the back light adjustment unit is configured to generate the second back light compensation signal.

9. The display of claim 2, wherein:

the image data generation unit is configured to output a back light signal indicating a back light level determined depending on the luminance of the four-color compensation image signals, and the back light adjustment unit is configured to add one of the first back light compensation signal or the second back light compensation signal to the back light signal to compensate luminance reduction by the slit barrier.

10. A method of compensating luminance reduction by a slit barrier in a three-dimensional display, comprising:

extracting a white image signal from three-color input image signals to generate four-color compensation image signals;

determining a back light level in accordance with the luminance of the four-color compensation image signals;

generating a back light compensation signal compensating the luminance reduction by the slit barrier to compensate the back light level; and outputting a back light pulse having a pulse width that varies based on i) a lowest back light level and ii) a first back light compensation signal when a slit barrier is turned off and on a second back light compensation signal when the slit barrier is turned on.

11. The method of claim 10, further comprising:

determining whether or not the three-dimensional display operates in a 3D mode.

12. The method of claim 11, wherein:

when the three-dimensional display operates in a 2D mode, the back light compensation signal is a first back light compensation signal compensating basic luminance reduction by the slit barrier.

13. The method of claim 11, wherein:

when the three-dimensional display operates in the 3D mode, the back light compensation signal is a second back light compensation signal compensating the basic luminance reduction by the slit barrier and compensating luminance reduction by an aperture ratio of the slit barrier.

14. The method of claim 11, further comprising:

mapping the four-color compensation image signals to a logical arrangement structure of a pixel.

15. The method of claim 14, wherein:

when the three-dimensional display operates in the 2D mode, the logical arrangement structure of the pixel is a first logical arrangement structure including a red pixel, a green pixel, a blue pixel, and a white pixel, wherein the red pixel, the green pixel and the blue pixel are sequentially adjacent to each other in a first pixel row, and the white pixel is in a second pixel row which is adjacent to the first pixel row.

16. The method of claim 14, wherein:

when the three-dimensional display operates in the 3D mode, the logical arrangement structure of the pixel is a second logical arrangement structure including a red pixel, a green pixel, a blue pixel and a white pixel, wherein the red pixel and the green pixel are adjacent to each other in a first pixel row, and the blue pixel and the white pixel are adjacent to each other in a second pixel row which is adjacent to the first pixel row.

17. A method of driving a three-dimensional display, comprising:

extracting a white image signal from three-color input image signals to generate four-color compensation image signals;

determining a 3D operation mode of the three-dimensional display to map the four-color compensation image signals in accordance with one of a first logical arrangement structure of a T type and a second logical arrangement structure of a 2×2 matrix type according to the 3D operation mode;

adjusting the logical arrangement of pixels according to the 3D operation mode;

mapping the four-color compensation image signals to the physical structure of pixels according to one of the first logical arrangement structure and the second logical arrangement structure to configure an image data signal; and generating a back light pulse having a pulse width that varies based on i) a lowest back light level and ii) a first back light compensation signal when a slit barrier is turned off and a second back light compensation signal when the slit barrier is turned on.

18. The method of claim 17, wherein:

the first logical arrangement structure includes a red pixel, a green pixel, a blue pixel, and a white pixel, wherein the red pixel, the green pixel, and the blue pixel are sequentially adjacent to each other in a first pixel row, and the white pixel is in a second pixel row which is adjacent to the first pixel row.

19. The method of claim 17, wherein:

the second logical arrangement structure includes a red pixel, a green pixel, a blue pixel and a white pixel, wherein the red pixel and the green pixel are adjacent to each other in a first pixel row, and the blue pixel and the white pixel are adjacent to each other in a second pixel row which is adjacent to the first pixel row.

20. The method of claim 17, wherein:

the back light compensation signal has a value compensating basic luminance reduction by the slit barrier.

21. The method of claim 17, wherein:

the back light compensation signal has a value compensating the basic luminance reduction by the slit barrier and luminance reduction by an aperture ratio of the slit barrier.

* * * * *